United States Patent [19]

Daniels

[11] Patent Number: 4,518,447
[45] Date of Patent: May 21, 1985

[54] METHOD OF MAKING MULTI-SECTION DECORATIVE PANEL

[76] Inventor: Phillip D. Daniels, 4797 Lake Bluff, West Bloomfield Township, Pontiac County, Mich. 38033

[21] Appl. No.: 167,422

[22] Filed: Jul. 11, 1980

[51] Int. Cl.³ .......................... E04B 2/00; B32B 31/00
[52] U.S. Cl. ..................................... 156/71; 156/264; 156/266; 428/52
[58] Field of Search ............. 428/52; 430/22; 156/71, 156/264, 266

[56] References Cited

PUBLICATIONS

Modern Packaging Enc., vol. 43, No. 7A, pp. 104, 106, (1970).
Modern Packaging Enc., vol. 32, No. 3A, pp. 202, 203, (1958).
The Lithographer's Manual, Fourth Ed., p. 9:16–17, (1968).

*Primary Examiner*—John D. Welsh
*Attorney, Agent, or Firm*—Hiram P. Settle

[57] ABSTRACT

A multi-sectioned, decorative panel for use in a bathtub surround or the like, the panel having an overall decorative pattern on the exposed surface thereof. The sections of the panel are retained in assembly with the overall decorative pattern of the sections in exact registry and alignment by means of an adhesive strip secured to the section edges and forming a hinge about which the panels can be folded for packaging and shipping and which remains in place during installation, so as to prevent misalignment of the panels, disruption of the overall decorative pattern, and any water leakage between the panel sections. The method of making the multi-sectioned panel is disclosed, as well as the method of installing the panel on a wall surface.

2 Claims, 8 Drawing Figures

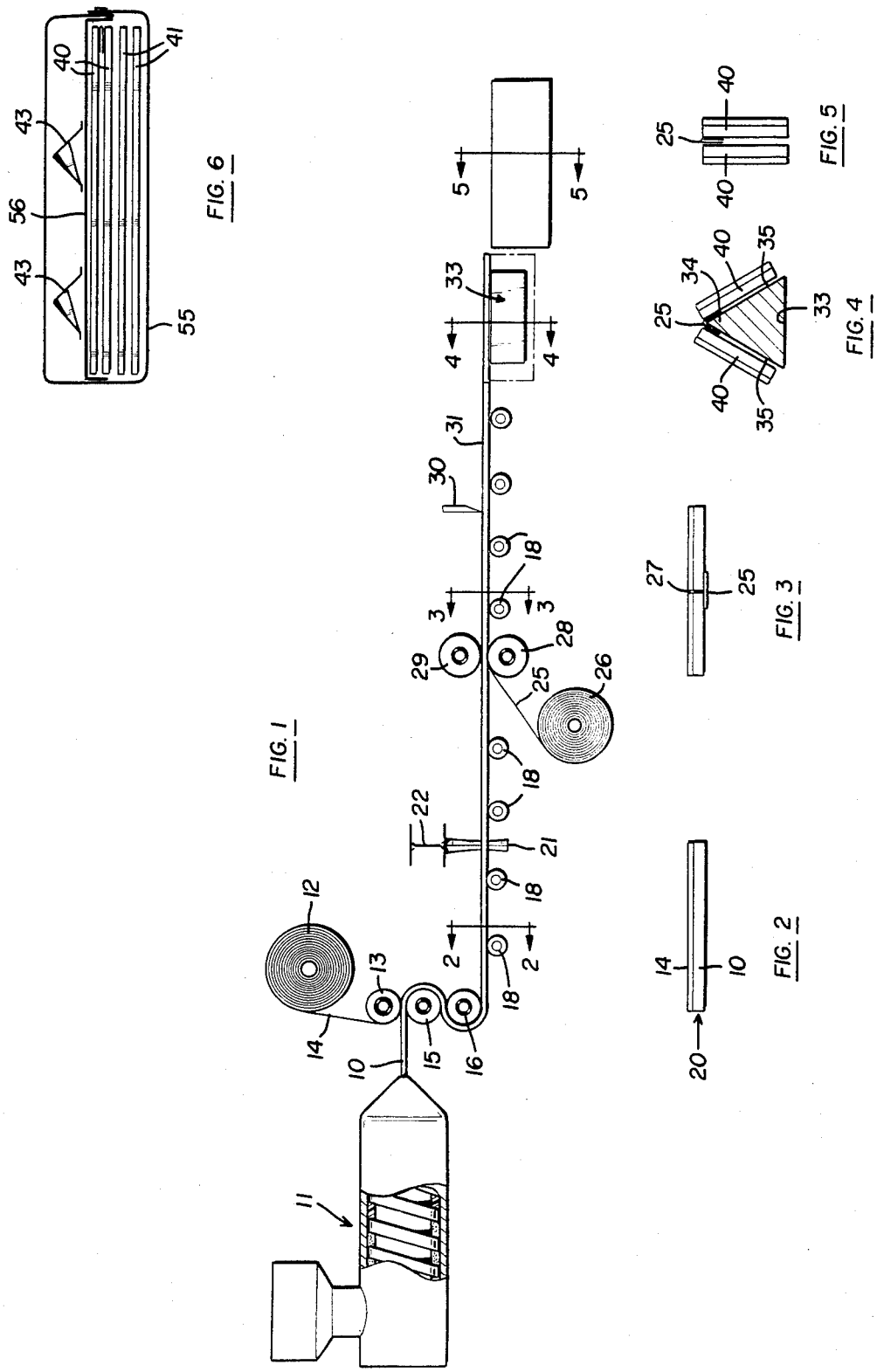

METHOD OF MAKING MULTI-SECTION DECORATIVE PANEL

BACKGROUND OF THE INVENTION

In the merchandising of bathtub surround kits and other wall panels, it is desired to package the kit or panel into the smallest possible container for ease of handling, for transportation in today's smaller cars, and to lessen the requisite store inventory and display space per kit.

In a bathtub surround kit, it is necessary to cover a wall area extending length-wise of the tub which is about the length of the tub, i.e. a minimum of 54 inches. Various schemes, e.g. complex elongated corner pieces overlapping a wide center panel, have been proposed in the prior art to minimize the kit package size. The limiting package size factor is the width of the central panel, i.e. at least 30 inches.

Other proposals have included multiple panels of less width and which are joined along their vertical, abutting edges by a separate joining extrusion element. However, where the center panel is decorated with a pattern, e.g. an overall marble pattern or an overall scenic pattern which extends across the joint, any such extrusion element interrupts the pattern.

The use of individual panels of less width requires precise registry of the panel sections to preserve the pattern. Such precise registry is practically impossible to maintain in mass produced, intermingled panel sheets which are then installed by relatively unskilled, do-it-yourself homeowners. As a result, all such suggested prior art center panels have been unsatisfactory, from either an aesthetic standpoint or from a packaging and sales standpoint.

SUMMARY OF THE INVENTION

The present invention now provides an improved, multisectional decorative panel for a tub surround kit or the like. The panel is initially manufactured, as by extrusion, as a full-width panel, and the full-width panel is then decorated, as by the application of an overlay sheet, by silk screening, or the like.

The panel is then slit or otherwise subdivided into the desired number of sections, preferably two, and the sections are retained in assembly in their precise position at which the overall pattern registers exactly. This is accomplished by applying an adhesive sheet to the non-decorated surface of the panel sections after the sections have been severed but before they have been moved relative to one another. The adhesive sheet also acts as a hinge between the sections, so that the sections may be folded to an assembly which has a width corresponding to the width of the sections only.

The sections then are packaged, for example, as part of a tub surround kit, in a package which is of reduced dimensions relative to the width dimension of the overall panel and the overall decorative pattern which has been applied to the panel. In such a kit, the panel sections may be only 24 inches wide. Yet, the assembly, in combination with relatively simple, minimal corner sections, can easily cover a 54 inch wall.

For installation, the folded panel sections are simply hingedly unfolded into their original aligned positions, with the pattern bridging the two sections and the two sections themselves being held in alignment by the adhesive sheet. The sections are then installed on the supporting structure, such as the wall adjacent a bathtub. Even during installation, the adhesive sheet remains in place to insure the necessary precise registration of the overall pattern and, in the case of a bathtub surround, to prevent any leakage of water through the joint between the panels. Since the adhesive sheet was applied during the manufacturing process and while the two sheets are in immediate proximity to one another, the joint formed between the two panel sections is extremely minute and is not visually apparent upon a casual inspection from a distance.

Thus, the present invention provides a multi-sectional decorative panel for a tub surround kit or the like which preserves in precise registry the overall pattern decorating the exposed surface of the panel, which accommodates the packaging of the panel into a box or container of minimal size, which retains the precise pattern registry during shipping and installation, and which prevents any leakage between the panel sections in use.

ON THE DRAWINGS

FIG. 1 is a diagramatic representation of a method of the present invention as applied to the manufacture of a multisectioned panel of the present invention;

FIG. 2 is a sectional view taken along the plane 2—2 of FIG. 1;

FIG. 3 is a sectional view taken along the plane 3—3 of FIG. 1;

FIG. 4 is a sectional view taken along the plane 4—4 of FIG. 1;

FIG. 5 is a sectional view taken along the plane 5—5 of FIG. 1;

FIG. 6 is a schematic view of a bathtub surround kit as packaged;

THE PREFERRED EMBODIMENT OF THE INVENTION

Figure 8:
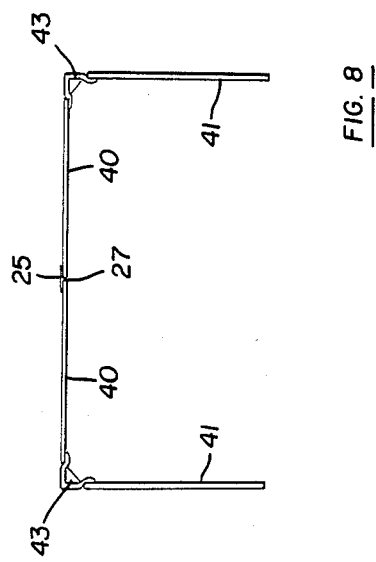
FIG. 8 is a schematic plan view of the installed tub surround kit of FIG. 7, with the supporting wall structure being eliminated for clarity of illustration.

As illustrated in FIG. 1 of the present invention, a sheet 10 is formed by extrusion from an extruder schematically illustrated at FIG. 11. Preferably, the sheet 10 is a thermoplastic material such as ABS (acrylo-nytrile-butadiene-styrene copolymer which is readily available commercially from Borg-Warner Corporation, Dow Chemical Company and others).

The extruded sheet 10 has applied thereto a surface decoration, such as a decorative plastic foil supplied from a supply roll 12 and applied to the sheet by means of an applicator roll 13 overlying the extruded sheet. The decorative sheet 14 is adhesively secured to the extruded sheet 10 by any suitable means, as is well-known in the prior art. Such adhesion is assured by the passage of the laminate of the two sheets 10, 14 about laminating pressure rolls 15, 16, so that the sheet issuing from the lower roll 16 comprises the base sheet 10 having the decorative film or foil 14 applied to the upper surface thereof, as illustrated in FIG. 2 of the drawings.

The decoration, which can be applied by other means such as silk screening, painting or the like, forms an overall pattern across the sheet or, at least, across the center of the sheet 10.

The composite sheet or panel 20 is supported horizontally on idler support rolls 18 to travel in a pre-determined, fixed path. If desired, various holddown rolls can be added to prevent any lateral or longitudinal shifting movement of the sheet on the support rolls 18, but such are not generally necessary.

The composite sheet or panel 20 bearing the decorative upper surface is then slit lontitudinally into two or more panel sections 40 by means of a fixed slitting blade 21 extending vertically downwardly from an upper support 22.

Next, a strip of adhesive sheet material 25 is applied from a supply roll 26 to the undersurface of the sheet or panel sections 40 to bridge the slit 27 (FIG. 3) which has been formed by the slitter 21. To facilitate the application of the adhesive strip 25, a lower applicator roll 28 and an upper pressure roll 29 are provided.

The longitudinally continuous panel sections 40 are then severed transversely into panel sections of the desired length by means of a vertical guillotine-type cutter, indicated schematically at 30.

The severed panel sections 40 travel over a triangular breaker 33 schematically illustrated in FIG. 4 of the drawings. This breaker 33 has an upper apex 34 and downwardly diverging side surfaces 35. The apex 34 of the breaker is aligned with the slit 27, so that the panel sections 40 are partially folded as the severed sections pass over the breaker 33.

From the breaker 33, the composite panel, consisting of the two panel sections 40 joined by the adhesive strip 25, is folded to a flat-wise configuration as shown in FIG. 5, with the non-decorative surfaces of the panel sections in abutment.

Figure 7:
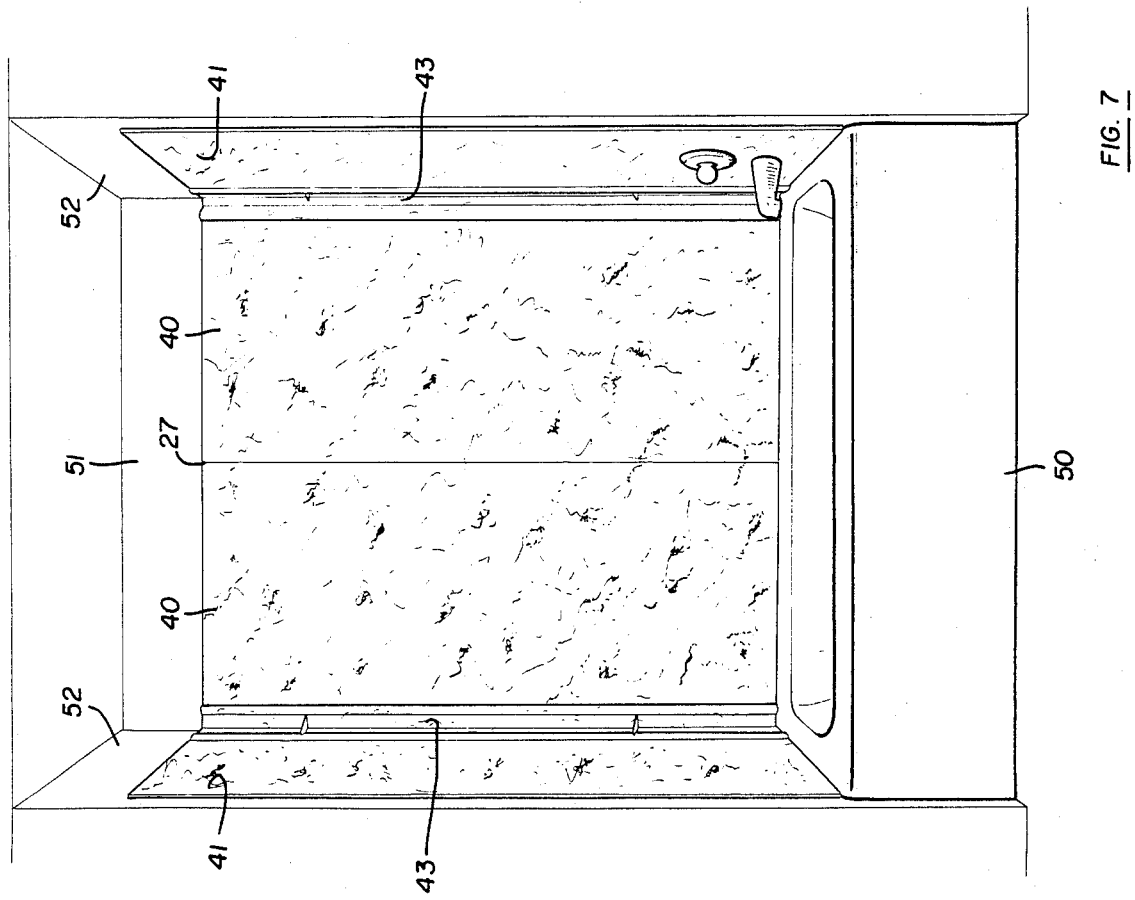
FIG. 7 is a somewhat schematic perspective view showing an installed tub surround kit incorporating a panel of the present invention.

The panel, if desired, can be utilized to form a portion of a kit, such as a kit for a bathtub enclosure illustrated in FIG. 7. As seen in FIGS. 7 and 8, the kit is intended to be applied as a surround for a bathtub 50 which is installed between a longitudinal backwall 51 and endwalls 52 normal to the wall 51. The kit comprises the two pre-assembled and retained panel sections 40 which cover the back wall 51, two end panels 41 attached to the end walls 52, and angular corner members 43 which cover the juncture of the panels 40 with the adjacent end walls 41.

As explained in my co-pending application, Ser. No. 51,730, filed June 25, 1979, now abandoned, the panels are secured to the walls 51, 52 by suitable means, such as caulking cement, and the corner members 43 then are installed in the same way, with the vertical edges of the corner members 43 overlapping the adjacent edges of the panels 40, 41.

As will be seen from FIG. 6, the composite center panel includes the two panel sections 40, each of which is of the same size as each of the end wall panels 41. The panels 41 and 40 are simply superimposed upon one another in the bottom section of an opened paperboard box 55 or the like, a packing divider 56 is then placed over the stacked panels, the corner sections 43 are then superimposed on the packing member 56, and the box is closed and secured.

Preferably, the panel sections 40 and the end panels 41 are each 24 inches in width and all are 55 inches in height. The entire assembly kit, as shown in FIG. 6, fits into a box 55 which is 24 inches by 55 inches by 5 inches. This size can be easily handled, stored and transported.

The tape strip 25 remains in place in the finally installed bathtub enclosure, this tape serving several functions, i.e. the maintenance of the panel sections 40 adjacent to one another without misalignment and without disruption of the panel surface decoration, the sealing of the slit 27 between the two panel sections 40 against the entry of any water therethrough, and the securing of the panel center section to the wall by the caulking compound which is applied to the back or undecorated surfaces of the panel sections 40 and to the tape itself prior to installation of the panel sections on the wall 51. As indicated in FIG. 7, the slit line 27 is so slight as to be hardly be noticeable, and the overall pattern applied to the exposed surfaces of the panel sections 40 also aids in masking the slit line so that it is not visible from any distance.

Thus, it will be seen that the structure of the present invention relates back to the way in which the panel sections 40 are manufactured, taped together, folded, shipped, and installed. All of this occurs without any relative movement between the two panel sections following the slitting of the panel into the two sections. Consequently, the overall pattern applied to the exposed surfaces of the panel sections cannot be disrupted or misaligned in any manner, so that the finished and installed panel sections appear to be a single entity having an overall integral design on the exposed surfaces thereof.

I claim:

1. A method of making and installing on a wall surface or the like a multi-width panel having an overall surface decoration, comprising the steps of:
   (1) extruding and decorating said panel with said overall surface decoration applied to the full panel width,
   (2) slitting the panel longitudinally into partial width sections after extrusion and decoration, but without relative movement of the panel sections,
   (3) applying an adhesive sheet to the non-decorated side of each of the panel sections while retaining the slit sections in position to retain the overall surface decoration, the adhesive sheet bridging the slit line between adjacent sections to thereafter retain the panel sections against misalignment,
   (4) folding the taped sections in the direction of the tape, so that the adhesive sheet forms a hinge,
   (5) unfolding the taped sections at the installation location, and
   (6) securing said sections, while still taped and while still retained in registry, to a supporting surface to reform the overall surface decoration without any misalignment of the panels.

2. A method of making a multi-sectional decorative panel, comprising the steps of:
   (1) forming a full width panel,
   (2) applying an overall decorative pattern to the upper surface of the panel,
   (3) slitting the panel longitudinally into a plurality of sections, with the overall pattern extending through the slits formed by the slitting operation,
   (4) without misaligning the sections and the pattern thereon, applying to the undersurface of said panel sections adhesive strips bridging the adjacent severed edges of said panel sections, and
   (5) folding said sections with said adhesive strips therebetween to retain the panels against misalignment and disruption of the overall pattern.

* * * * *